United States Patent
Lama et al.

(10) Patent No.: US 10,460,518 B2
(45) Date of Patent: Oct. 29, 2019

(54) MODIFYING A SUB-DIVISION MODEL BASED ON THE TOPOLOGY OF A SELECTION

(71) Applicant: Dassault Systemes SolidWorks Corporation, Waltham, MA (US)

(72) Inventors: Salvatore Francis Lama, Bolton, MA (US); Yunching Huang, Superior, CO (US); Harish C. Manohar, Acton, MA (US)

(73) Assignee: Dassault Systemes SolidWorks Corporation, Waltham, MA (US)

( * ) Notice: Subject to any disclaimer, the term of this patent is extended or adjusted under 35 U.S.C. 154(b) by 0 days.

(21) Appl. No.: 15/396,085

(22) Filed: Dec. 30, 2016

(65) Prior Publication Data

US 2017/0193695 A1    Jul. 6, 2017

Related U.S. Application Data

(60) Provisional application No. 62/273,870, filed on Dec. 31, 2015.

(51) Int. Cl.
  *G06T 17/10* (2006.01)
  *G06T 17/20* (2006.01)
  *G06T 19/20* (2011.01)

(52) U.S. Cl.
  CPC ............ *G06T 17/205* (2013.01); *G06T 19/20* (2013.01); *G06T 2200/24* (2013.01); *G06T 2219/2021* (2013.01)

(58) Field of Classification Search
  CPC .............................. G06T 17/10; G06T 17/205
  USPC ......................................................... 345/420
  See application file for complete search history.

(56) References Cited

U.S. PATENT DOCUMENTS

| 5,701,403 | A | * | 12/1997 | Watanabe | ............... | G06T 17/10 |
| | | | | | | 345/419 |
| 8,421,798 | B2 | * | 4/2013 | Rameau | .................. | G06T 17/10 |
| | | | | | | 345/419 |
| 2005/0210444 | A1 | * | 9/2005 | Gibson | .................... | G06F 17/50 |
| | | | | | | 717/108 |
| 2008/0255809 | A1 | * | 10/2008 | Ran | ......................... | G06F 17/50 |
| | | | | | | 703/1 |
| 2013/0181987 | A1 | * | 7/2013 | Fowler | .................... | G06T 19/20 |
| | | | | | | 345/420 |

\* cited by examiner

*Primary Examiner* — Hai Tao Sun
(74) *Attorney, Agent, or Firm* — Hamilton, Brook, Smith & Reynolds, P.C.

(57) ABSTRACT

A computer-implemented method and system create a three-dimensional (3D) model represented by a sub-division surface and defining a solid or a surface model. A selected entity of the 3D model is selected and with one or more surrounding entities a determination is made of a type of operation to perform. The operation is an add operation or a remove operation, and the operation changes the topology of the 3D model.

20 Claims, 11 Drawing Sheets
(10 of 11 Drawing Sheet(s) Filed in Color)

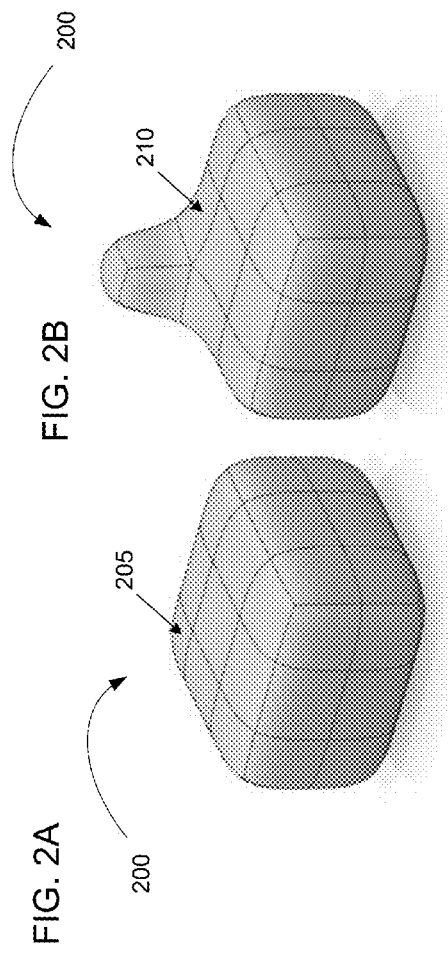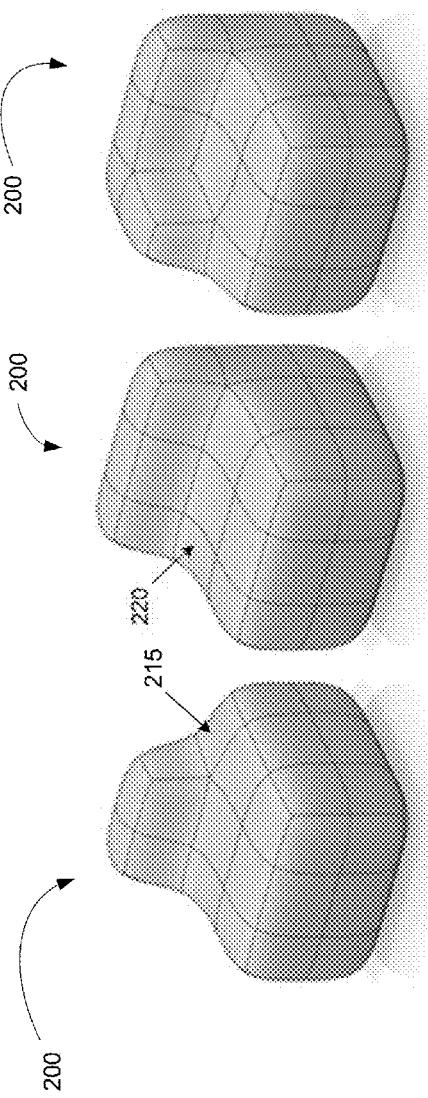

— 300

— 302
— 304

MODIFYING A SUB-DIVISION MODEL BASED ON THE TOPOLOGY OF A SELECTION

RELATED APPLICATION

This application claims the benefit of U.S. Provisional Application No. 62/273,870, filed on Dec. 31, 2015. The entire teachings of the above application(s) are incorporated herein by reference.

BACKGROUND OF THE INVENTION

Computer-aided design (CAD) software allows a user to construct and manipulate complex three-dimensional (3D) models. A number of different modeling techniques can be used to create a 3D model. One such technique is a solid modeling technique, which provides for topological 3D models where the 3D model is a collection of interconnected topological entities (e.g., vertices, edges, and faces). The topological entities have corresponding supporting geometrical entities (e.g., points, trimmed curves, and trimmed surfaces). The trimmed surfaces correspond to topological faces bounded by edges. Hereinafter, the terms vertex, edge, and face will be used interchangeably with their respective, corresponding geometric entities.

In many CAD systems, curves and surfaces are generally represented as analytical or spline curves and surfaces (e.g., Bezier curves and surfaces), and in particular as non-uniform rational b-spline (NURBS) curves and surfaces. Additionally, some CAD systems utilize tessellated models whereby the surfaces of a model are faceted by sub-dividing each surface into triangular or other polygonal shapes thereby creating a mesh; hereinafter such a surface shall be referred to as a subdivision surface.

Subdivision surfaces may be used to define solid and surface models. The mesh may be referred to as a cage and by manipulating the cage, the shape of the underlying surface is modified. To manipulate and thereby modify the sub-division cage, a user is required to drag and position parts of the cage to achieve a required result. This involves quite a bit of user interaction and the performance of Euler operations for each modification, which may be computationally intensive and reduce the level of user interaction that is possible.

Working with sub-division models requires a certain level of understanding about how the structure of the cage relates to the resulting freeform shape. Moreover, traditional commands for adding to and manipulating a sub-division cage are targeted at a mature and educated audience. The present invention addresses these problems by enabling a computer system to make these tasks intuitive enough to engage a child (e.g., between the ages of 4 and 14), and thereby, enhances the scope of CAD system offerings.

SUMMARY OF THE INVENTION

In general, in one aspect, embodiments of the invention feature a computer-implemented method for modifying a computer-generated model on a computerized system. The method creates a three-dimensional (3D) model. The 3D model is represented by a sub-division surface, and the sub-division surface defines a solid or a surface model. An entity of the 3D model is selected, where the entity is a face, an edge, or a vertex. Additionally, the method determines a type of change to the topology of the 3D model, where the type of change is dependent on at least one other surrounding entity. An add operation or a remove operation is performed, and the operation causes the 3D model to increase in size or decrease in size, respectively. The type of change to the topology determines the way in which the operation increases or decreases the volume of the 3D model depending whether the operation is the add operation or remove operation, respectively.

Embodiments include repositioning one or more edges of the 3D model and rebuilding the topology surrounding those edges. When the selected entity is a face containing a vertex surrounded by three faces having radiating edges with a consistent convexity, the method includes removing the three faces and rebuilding the topology surrounding the three faces to increase or decrease the volume of the 3D model. When the selected entity is an edge or a face containing an edge and the surrounding faces of the edge have concave convexity or convex convexity, the method further includes (a) removing the surrounding faces and additional faces sharing a common vertex with the edge if the edge has concave convexity, or (b) removing the surrounding faces if the edge has convex convexity, and rebuilding the topology given the absence of the surrounding faces and in the case of concave convexity the additional faces.

Additional embodiments include determining if the consistent convexity is concave or convex and executing the remove operation or add operation, respectively. Yet other embodiments include repositioning two edges and rebuilding the topology surrounding the two edges. Other embodiments include determining a set of faces that includes a selected face, where the set of faces are comprised of at least one boundary loop, removing the set of faces, and rebuilding the topology of the 3D model in the absence of the set of faces. Additionally, an embodiment includes selecting a face and applying an inward or an outward extrusion operation to the face.

Other embodiments include a computer-aided design (CAD) system having a processor operatively coupled to a data storage system and a data storage memory operatively coupled to the processor. In such embodiments, the data storage system stores a three-dimensional model, and the data storage memory comprises instructions to configure the processor to create a three-dimensional (3D) model represented by a sub-division surface that defines a solid or a surface model, select a face of the 3D model, where the face and at least one surrounding entity determine whether to perform an add operation or a remove operation, and the operation causes the topology of the 3D model to change. Embodiments of the CAD system contain a classification module, where the classification module determines a selection type and the selection type determines a first set of entities to remove and a second set of entities to create to change the topology.

Yet other embodiments include a non-transitory computer-readable data storage medium comprising instructions that cause a computer to create a three-dimensional (3D) model represented by a sub-division surface that defines a solid or a surface model, select a face of the 3D model, where the face and at least one surrounding entity determine whether to perform an add operation or a remove operation, and the operation causes the topology of the 3D model to change. Embodiments comprise further instructions to change the topology based on a determination of a selection type, a first set of entities to remove, and a second set of entities to create.

The details of one or more embodiments of the invention are set forth in the accompanying drawings and the description that follows. Other features, objects, and advantages of the invention will be apparent from the description and drawings, and from the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing will be apparent from the following more particular description of example embodiments of the invention, as illustrated in the accompanying drawings in which like reference characters refer to the same objects throughout the different views. The drawings are not necessarily to scale, emphasis instead being placed upon illustrating embodiments of the present invention.

FIG. 2A-2E are illustrations of a 3D model and the addition of material to the 3D model.

DETAILED DESCRIPTION OF THE INVENTION

The present invention enables a user to quickly add or remove material from a sub-division model using a method by which, in one embodiment, a cage of a six-sided polyhedron (e.g., a cube) is merged with or subtracted from a cage of an existing sub-division model. To add or remove a volume of material from a three-dimensional (3D) model, the user simply selects a face of the 3D model and a six-sided polyhedral is added to the 3D model or removed from the 3D model, respectively, at the location of the selected face.

Figure 1A:
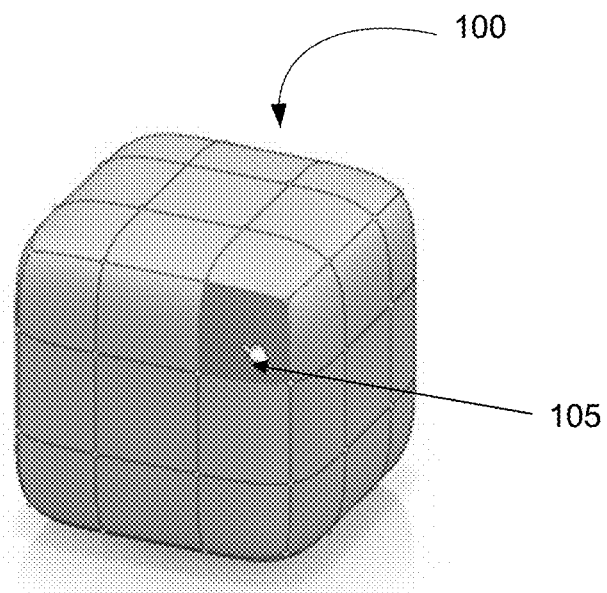
FIG. 1A-1G are illustrations of a 3D model and the removal of material from the 3D model.
Figure 1B:
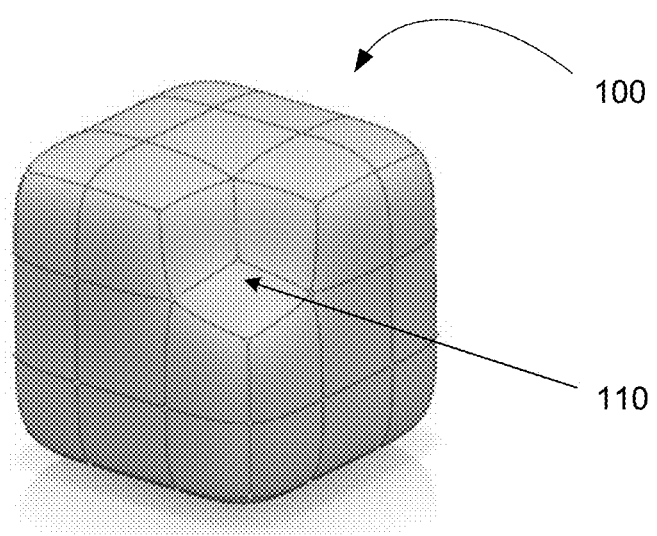

Referring to FIGS. 1A-1B, a basic example of an embodiment of the present invention is illustrated. FIG. 1A shows an original 3D model 100, which is a sub-division model that is a 3×3 cube. The 3D model 100 may be a solid model rather than a surface model, comprised of solid sections. To remove a volume of material from the 3D model 100, the user simply selects a face 105 of the model 100 using a cursor-controlled device, by way of non-limiting example. As shown in FIG. 1A, the selected face 105 is highlighted. Then, as shown in FIG. 1B, a first six-sided polyhedral (i.e., a cube in this case), to which face 105 belonged is removed from the 3D model 100 leaving space 110 in place of the first six-sided polyhedral.

Figure 1C:
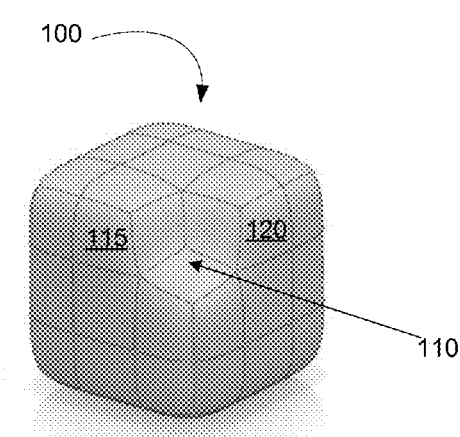
Figure 1D:
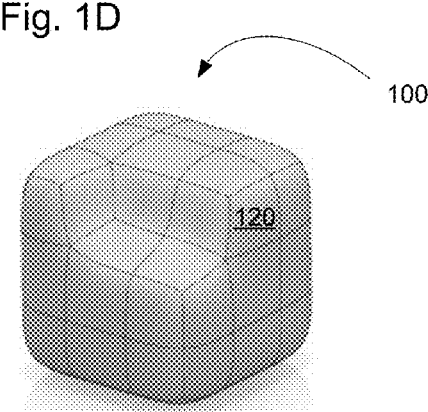
Figure 1E:
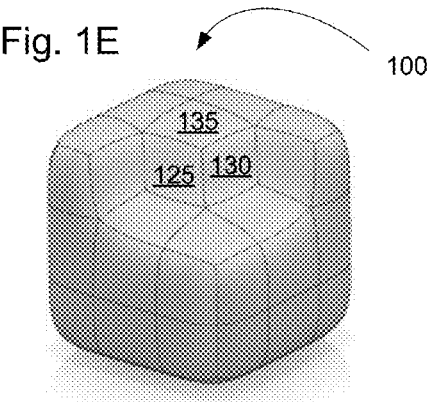
Figure 1F:
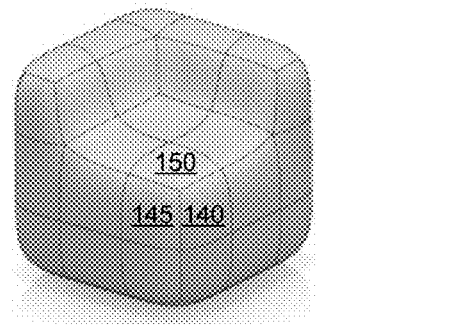
Figure 1G:
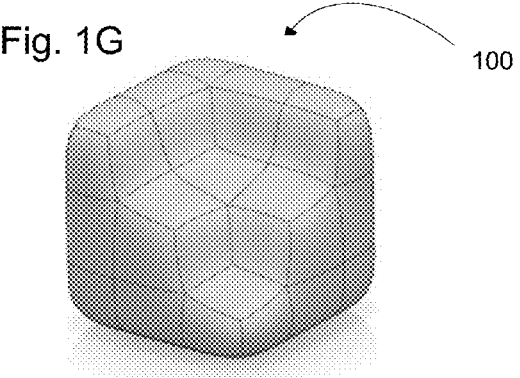

Referring now to FIGS. 1C-1G, the user may continue to select faces of the 3D model 100, each time removing a volume from the 3D model 100. FIG. 1C illustrates 3D model 100 in the same configuration as shown in FIG. 1B with additional faces indicated (i.e., second face 115 and third face 120), before being selected by the user. As shown in FIG. 1D, after being selected, the six-sided polyhedral to which second face 115 belonged is removed from the 3D model 100. Likewise, as shown in FIG. 1E, after being selected, the six-sided polyhedral to which third face 120 belonged is removed from the 3D model 100. FIG. 1E also indicates a fourth face 125, a fifth face 130, and a sixth face 135, any one of which may be selected to remove from the 3D model 100 a six-sided polyhedron to which the selected faces belonged (as shown in FIG. 1F). Lastly, FIG. 1F indicates a seventh face 140. After selection of the seventh face 140 or adjacent faces 145, 150 that belong to the same local cuboid, the six-sided polyhedral to which seventh face 140 belonged is removed from 3D model 100, as illustrated in FIG. 1G.

Referring now to FIGS. 2A-E, the present invention also enables the user to quickly add material by selecting faces as well. As illustrated in FIGS. 2A-E, a 3D model 200 begins as a 2×3×3 rectangular cuboid and through a series of selections material is added to the 3D model 200. In an embodiment, the user first enables an "add material" command and selects one face 205 of the 3D model 200. In an illustrative embodiment, a six-sided polyhedron (again a cube in this case) will be merged with the sub-division cage resulting in the addition of material, as illustrated in FIG. 2B. The user then selects a second face 210, a third face 215, and a fourth face 220. After each such selection, a polyhedron is merged with the sub-division cage, as shown in FIGS. 2B-2E.

Figure 3A:
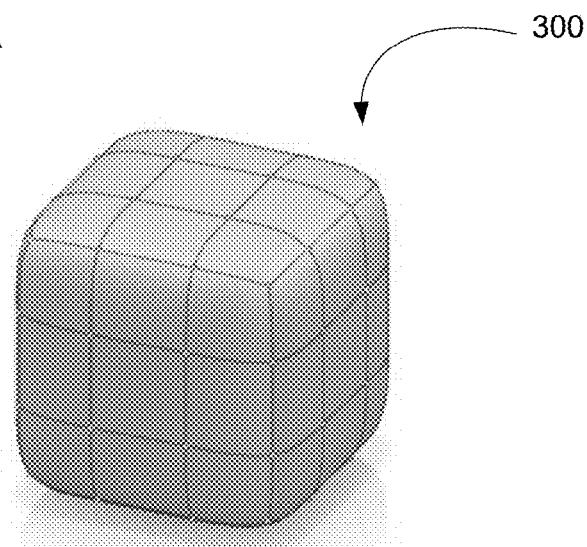
FIGS. 3A and 3B are illustrations of 3D models operated on in embodiments of the present invention.
Figure 3B:
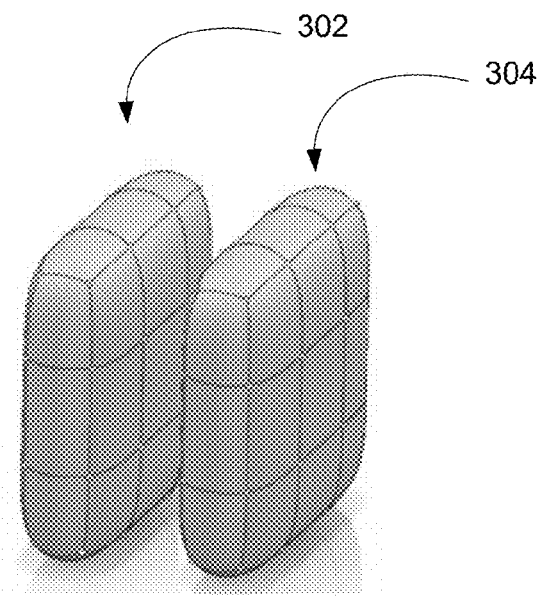

FIG. 3A and FIG. 3B illustrate how using the method described enables a user to transform a single body 300 into multiple bodies 302/304. The nine cubes in the middle of the single body 300 (which is a 3×3×3 cube) were removed to produce multiple bodies 302/304 (which are two 1×3×3 cuboids).

The present invention determines the type of a selection during an add and a remove operation, after which the present invention deploys a sequence of modeling operations for that specific selection type. The types include vertex, bridge, rail, patch, and extrude/indent. Following is a description of these types and the modeling operations executed to add and remove material for these specific types.

Figure 4:
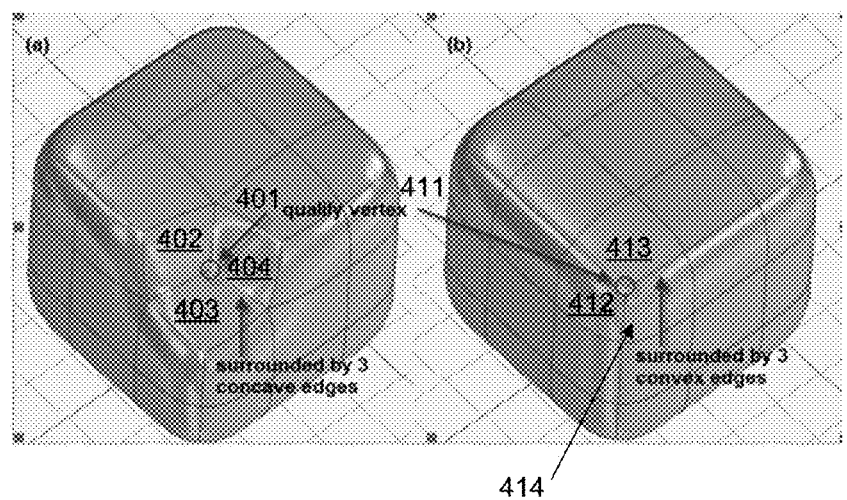
FIG. 4 is an illustration of a 3D model illustrating a vertex type of selection during operations of the present invention.

FIG. 4 illustrates a vertex type. A vertex type indicates that adding material to and removing material from a model can be done by repositioning a vertex and then rebuilding the surrounding topology. A vertex type is determined when a selected face contains a vertex (e.g., qualifying vertex 401 and qualifying vertex 411) that is surrounded by three faces having radiating edges with consistent concave or convex convexity (e.g., faces 402, 403, 404 and faces 412, 413, 414). The three faces are removed and the surrounding topology is rebuilt to add or remove material. In FIG. 4, qualified vertex 401 is surrounded by concave edges, whereas qualified vertex 411 is surrounded by convex edges. In the concave case (a), the faces 402, 403, 404 will be removed and new convex edges, as in (b), will be created. In the convex case (b), the faces 412, 413, 414 will be removed and new concave edges, as in (a), will be created.

Figure 5:
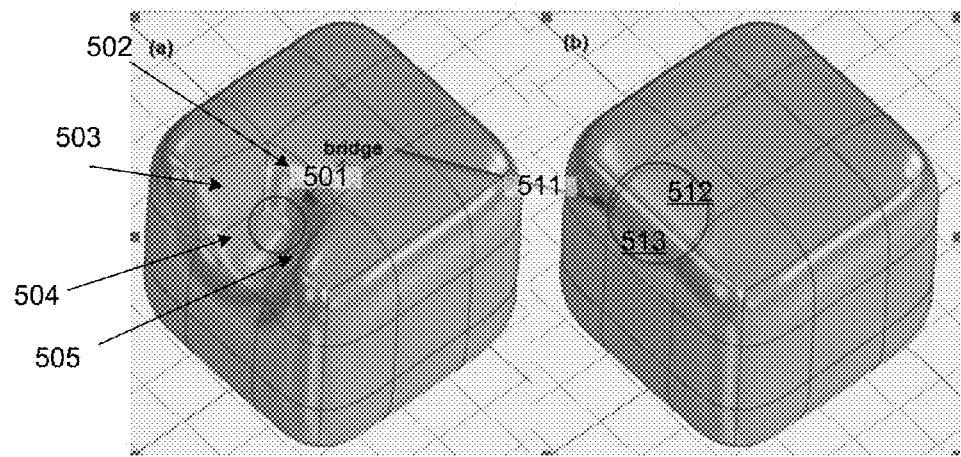
FIG. 5 is an illustration of a 3D model illustrating a bridge type of selection during operations of the present invention.

Referring now to FIG. 5, a bridge type is illustrated. A bridge type indicates that adding material to or removing material from a model can be accomplished by repositioning an edge (hence the name bridge) and rebuilding the surrounding topology. A bridge type is determined when a selected face contains an edge having neighboring faces that outline an area where material can be added or removed (e.g., edge 501 and edge 511). FIG. 5 shows two bridge cases—one concave and the other convex. In the concave case (a), the faces 502, 503, 504, 505 will be removed and new convex edges and faces (e.g., edge 511, face 512, face 513), as in (b), will be created. Removing a bridge edge in case (b), for example bridge edge 511, will require additional faces to be created a first two faces at the vertices of the bridge edge 511 and a second two faces between the first two, for example faces 503, 505, 502, and 504, as shown in (a).

Figure 6:
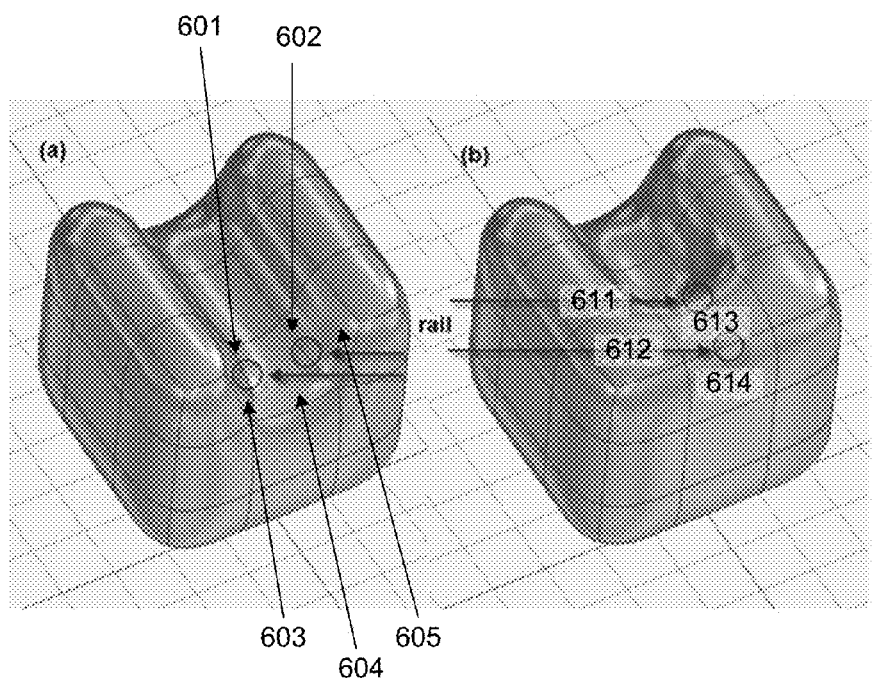
FIG. 6 is an illustration of a 3D model illustrating a rail type of selection during operations of the present invention.

Referring now to FIG. 6, an illustration of a rail type is shown. A rail type indicates that adding and removing material from a model can be done by repositioning two edges (hence the name rails) and rebuilding the surrounding topology. A rail type is determined when a selected face contains two edges having neighboring faces that outline an area where material can be removed. FIG. 6 depicts two rail cases—one concave and the other convex. In the concave case (a), the two rail edges are edge 601 and edge 602. In the convex case (b), the two rail edges are edge 611 and edge 612. In the concave case (a) in FIG. 6, faces 603, 604, and 605 will be removed and new convex rails (e.g., edge 611 and edge 612 as in (b)), will be created. In the concave case (b) in FIG. 6, face 613 and face 614 will be removed and new concave rails (e.g., edge 601 and edge 602 as in (a)), will be created.

Figure 7:
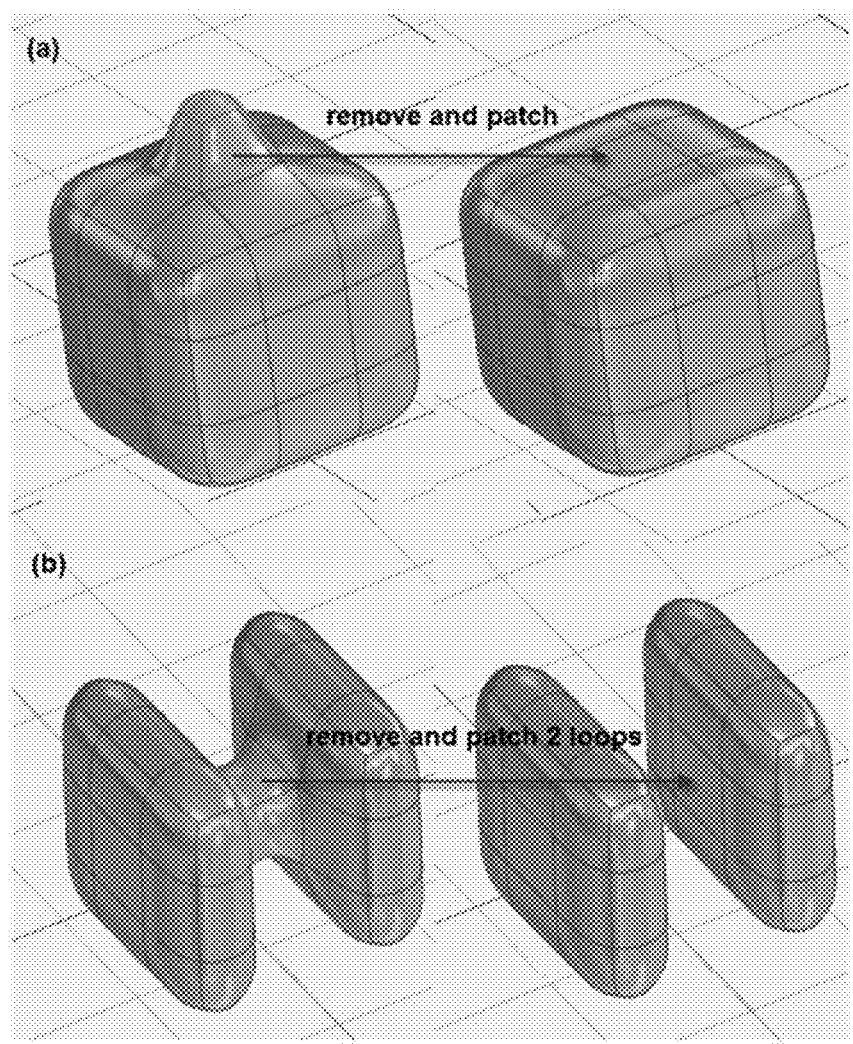
FIG. 7 is an illustration of a patch type selection during operations on a 3D model in embodiments of the present invention.

FIG. 7 illustrates a patch type. A patch type indicates that material can be removed and the resulting holes can be patched. A patch type is determined when a selected face can be expanded to a set of faces that enclose a removable and patchable volume. FIG. 7 illustrates two patch cases that contain a removable volume with one and two boundary loops, respectively. The highlighted faces are removed and boundary loop(s) are patched.

Figure 8:
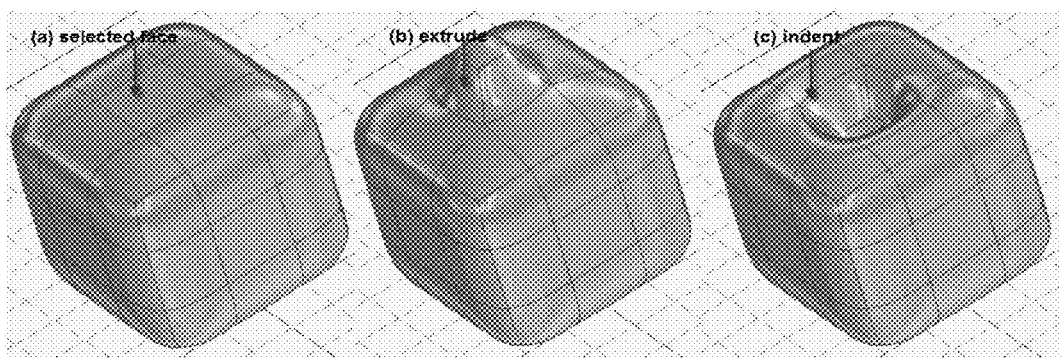
FIG. 8 is an illustration of an extrude/indentation type of selection during operations on a 3D model in embodiments of the present invention.

Referring now to FIG. 8, an extrude/indent type is illustrated. An extrude/indent type indicates that adding material to or removing material from a model can be accomplished through a standard outward or inward extrusion operation, respectively. An extrude/indent type is determined when a case does not qualify as any of the previous discussed types. FIG. 8 illustrates a case that can be extruded (b) or indented (c), where the extrusion operation is applied to selected highlighted face.

Figure 9:
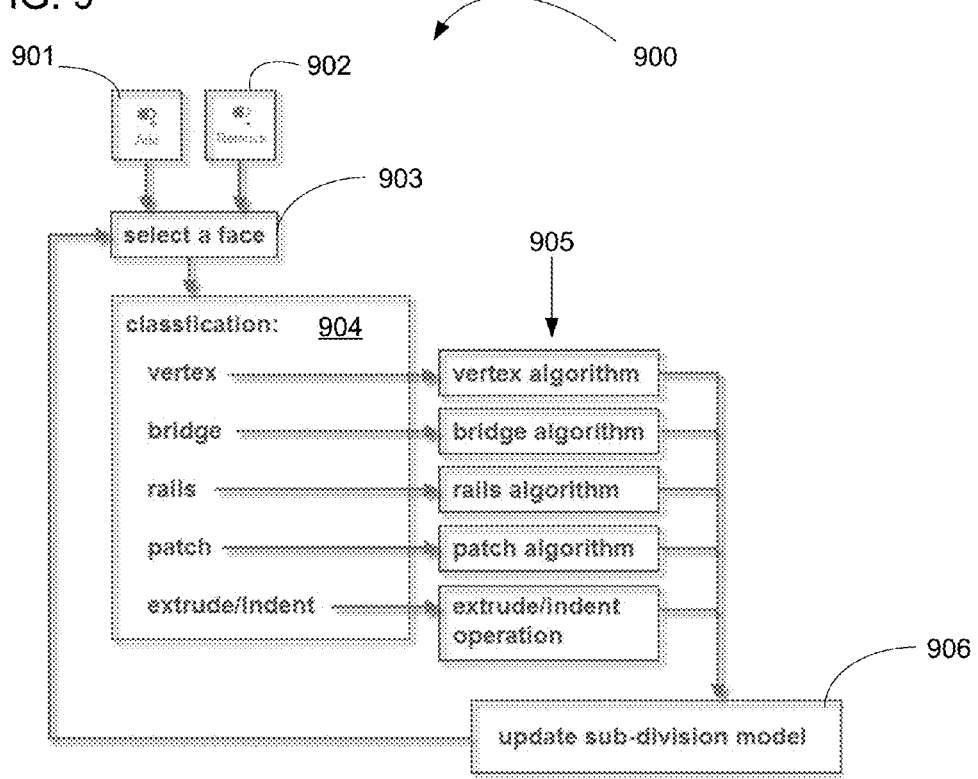
FIG. 9 is a flow diagram of an embodiment of the present invention.

Referring now to FIG. 9, a process 900 of an embodiment of the present invention is shown. The workflow starts when the Add 901 or Remove 902 tool is activated. Next, one or more faces are selected (step 903), After one or more faces are selected, the classification module 904 determines the selection type and executes the appropriate operations (step 905), as previously discussed. (Alternatively, the classification module 904 may continuously execute as a cursor or other pointing device moves over a sub-division model until one or more faces are selected.) The sub-division model is then updated (step 906) and another face may be selected (step 904).

Figure 10A:
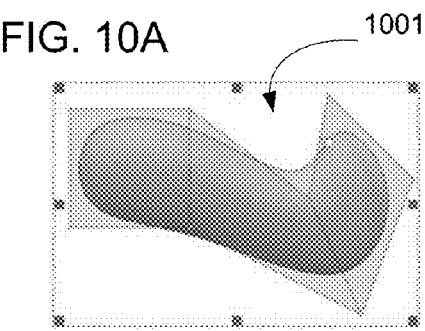
FIGS. 10A-10D are illustrations of additional analysis conducted in embodiments of the present invention.
Figure 10B:
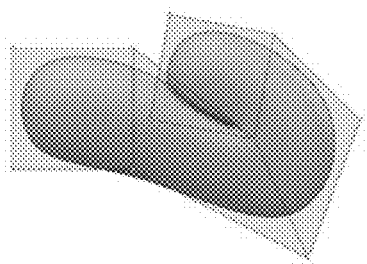
Figure 10C:
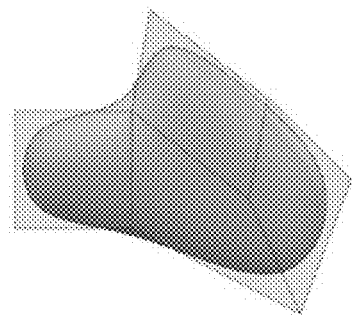
Figure 10D:
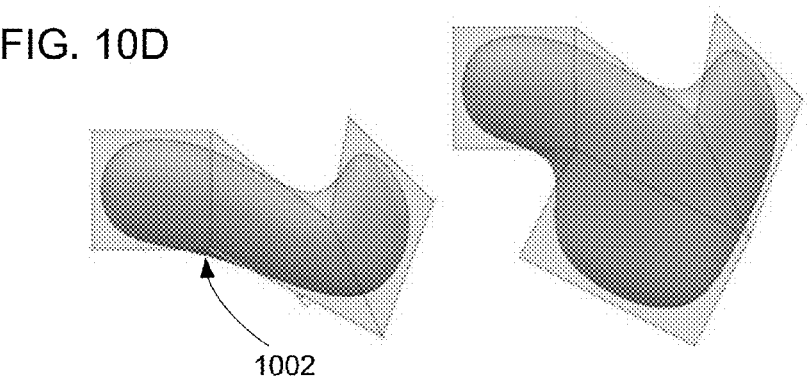

FIGS. 10A-10D illustrates additional analysis that determines how to modify a cage. When an angle 1001 between adjacent faces is less than ninety degrees, as shown in FIG. 10A, and the natural extension of a selected face would produce an underlying cage that would interfere with the cage itself, as shown in FIG. 10B, the adjacent face is consumed and the geometric result is the same as if adjacent faces were bridged as shown in FIG. 10C. When the angle 1002 between adjacent faces is greater than 90 degrees, the selected face is extruded with its own side faces, as shown in FIG. 10D.

Figure 11:
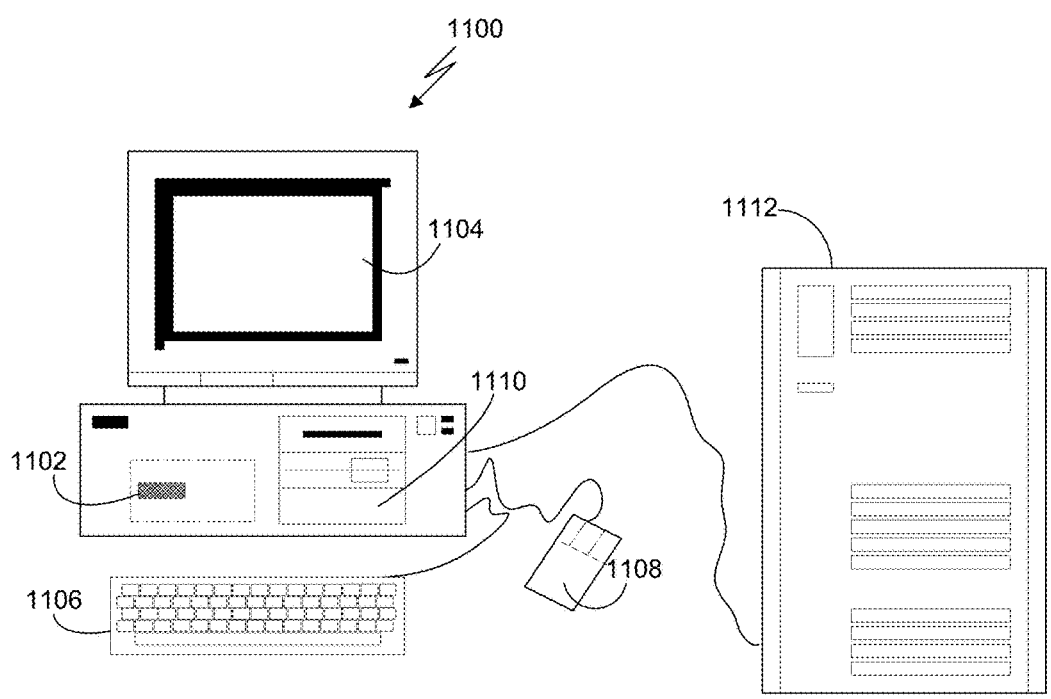
FIG. 11 is a schematic diagram of a computer system embodying the present invention.

FIG. 11 illustrates a computerized modeling system 1100 that includes a CPU 1102, a computer monitor 1104, a keyboard input device 1106, a mouse input device 1108, and a storage device 1110. The CPU 1102, computer monitor 1104, keyboard 1106, mouse 1108, and storage device 1110 can include commonly available computer hardware devices. For example, the CPU 1102 can include an Intel-based processor.

The mouse 1108 may have conventional left and right buttons that the design engineer may press to issue a command to a software program being executed by the CPU 1102. As an alternative or in addition to the mouse 1108, the computerized modeling system 1100 can include a pointing device such as a mouse, stylus, touch-sensitive pad, or pointing device and buttons built into the keyboard 1106. Those of ordinary skill in the art appreciate that the same results described herein with reference to a mouse device can be achieved using another available pointing device (e.g., a finger on a touchscreen device). Other appropriate computer hardware platforms are suitable as will become apparent from the discussion herein. Such computer hardware platforms are preferably capable of operating the Microsoft Windows® 7, UNIX, Linux, or MAC OS operating systems.

Additional computer processing units and hardware devices (e.g., rapid prototyping, video, and printer devices) may be included in the computerized modeling system 1100. Furthermore, the computerized modeling system 1100 may include network hardware and software thereby enabling communication to a hardware platform 1112, and facilitating communication between numerous computer systems that include a CPU and a storage system, among other computer components.

Computer-aided modeling software (e.g., process 900) may be stored on the storage device 1110 and loaded into and executed by the CPU 1102. The modeling software allows a user to create and modify a 3D model and implements aspects of the invention described herein. The CPU 1102 uses the computer monitor 1104 to display a 3D model and other aspects thereof as described. Using the keyboard 1106 and the mouse 1108, the user can enter and modify data associated with the 3D model. The CPU 1102 accepts and processes input from the keyboard 1106 and mouse 1108. The CPU 1102 processes the input along with the data associated with the 3D model and makes corresponding and appropriate changes to that which is displayed on the computer monitor 1104 as commanded by the modeling software. In one embodiment, the modeling software is based on a solid modeling system that may be used to construct a 3D model consisting of one or more solid and surface bodies.

Embodiments of the invention may be implemented in digital electronic circuitry, or in computer hardware, firmware, software, or in combinations thereof. Apparatuses may be implemented in a computer program product tangibly embodied in a machine-readable storage device for execution by a programmable processor; and method steps may be performed by a programmable processor executing a program of instructions to perform functions by operating on input data and generating output. Embodiments of the invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; in any case, the language may be a compiled or interpreted language. Suitable processors include, by way of non-limiting example, both general and special purpose microprocessors. Generally, a processor will receive instructions and data from a read-only memory and/or a random access memory and in some embodiments instructions and data may be downloaded through a global network. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, custom-designed ASICs (application-specific integrated circuits).

Embodiments of the present invention or aspects thereof described herein may be implemented in the form of hardware, firmware, or software. If implemented in software the software may be stored on any non-transient computer readable medium that is configured to enable a processor to load the software or subsets of instructions thereof. The processor then executes the instructions and is configured to operate or cause an apparatus to operate in a manner as described herein.

Although the present invention is described in connection with an exemplary computer system environment, embodiments of the invention are operational with numerous other general purpose or special purpose computer system environments or configurations. The computer system environment is not intended to suggest any limitation as to the scope of use or functionality of any aspect of the invention. Moreover, the computer system environment should not be interpreted as having any dependency or requirement relating to any one or combination of components illustrated in the exemplary operating environment. Examples of computer systems, environments, and/or configurations that may be suitable for use with aspects of the invention include, but are not limited to, personal computers (PCs), server computers, hand-held and laptop devices, multiprocessor systems, microprocessor-based systems, set top boxes, programmable consumer electronics, mobile telephones and mobile operating systems, network PCs, minicomputers, mainframe computers, distributed computing environments that include any of the above systems or devices, and the like. The computer system may have standalone components or workstations, or the computer system may be formed of networked computers by any of known communications networks, processing networks, cloud-based networks, related protocols and the like.

As can be appreciated, the network can be a public network, such as the Internet, or a private network such as an LAN or WAN network, or any combination thereof and can also include PSTN or ISDN sub-networks. The network can also be wired, such as an Ethernet network, or can be wireless such as a cellular network including EDGE, 3G and 4G wireless cellular systems. The wireless network can also be WiFi, Bluetooth, or any other wireless form of communication that is known. Thus, the network is merely exemplary and in no way limits the scope of the present advancements.

Advantages of the present invention include the natural method of adding and removing material from an object to modify that object. That is, a user simply picks a face where more material is desired, or similarly, less material is desired. The present invention creates intuitive interaction to modify an underlying sub-division model without requiring users to understand the mathematic fundamentals. A benefit of this interaction is that a complicated model is easy to use and fast to build. Dragging elements of a sub-division cage and positioning those elements is not required. The simplicity and predictability of creating a computer-generated model using the present invention enhances the user experience of sub-division surface modeling.

An engineer is a typical user of a 3D professional CAD system and is skilled in 3D modeling techniques. Younger people may find these 3D CAD systems too sophisticated for their use because, for example, these systems typically require a good deal of knowledge to be able to model objects. The present invention addresses this issue by creating a model that is sectioned in such a way that selecting a section quickly removes that section or adds another section at that location.

A number of embodiments of the present invention have been described. Nevertheless, it will be understood by those skilled in the art that various modifications may be made within the boundaries of the invention. For example, embodiments of the present invention may change the order in which operations are performed. Furthermore, depending on the needs of an implementation, particular operations described herein may be implemented as a combined operation, eliminated, added to, or otherwise rearranged. By way of non-limiting example, a classification type may be determined prior to a face being selected in FIG. 9.

What is claimed is:

1. A computer-implemented method for modifying a computer-generated model on a computerized system, the method comprising:
    creating in computer memory a three-dimensional (3D) model, wherein:
        the 3D model is represented by a sub-division surface; and
        the sub-division surface defines one of a solid and a surface model;
    selecting a face of the 3D model;
    in response to selecting the face, automatically by a processor coupled to the computer memory:
        determining entities associated with a six-sided polyhedral to which the face belongs, the entities including any of another face, an edge, and a vertex;
        determining a change type, the change type being a type of change to a topology of the 3D model, the change type defining a way to add material to the 3D model or remove material from the 3D model by: (a) repositioning one or more of the entities associated with the six-sided polyhedral, and (b) rebuilding the topology surrounding the repositioned one or more entities to add or remove the material, wherein the change type is determined based on at least one other surrounding entity of the six-sided polyhedral; and
        performing an operation using the determined change type, wherein:
            the operation is one of an add operation and a remove operation;

the operation causes a change in the 3D model that
(i) increases a size of the 3D model if the operation
is the add operation and (ii) decreases the size of
the 3D model if the operation is the remove
operation; and using the determined change type, the operation
applies the change to the topology that (i)
increases the size of the 3D model if the operation
is the add operation and (ii) decreases the size of
the 3D model if the operation is the remove
operation.

2. The computer-implemented method of claim 1, wherein the operation repositions one or more edges of the 3D model and rebuilds the topology surrounding the one or more edges.

3. The computer-implemented method of claim 1, wherein the selected entity is the face containing a vertex surrounded by three faces having radiating edges with a consistent convexity; and further comprising:
removing the three faces; and
rebuilding the topology surrounding the three faces to one of increase and decrease the size of the 3D model.

4. The computer-implemented method of claim 1, wherein:
the selected entity is one of the edge and the face containing the edge; surrounding faces of the edge have one of concave convexity and convex convexity; and further comprising:
removing the surrounding faces and additional faces sharing a common vertex with the edge if the edge has concave convexity;
removing the surrounding faces if the edge has convex convexity; and
rebuilding the topology given an absence of the surrounding faces and in the case of concave convexity the additional faces.

5. The computer-implemented method of claim 3, wherein:
if the consistent convexity is concave the operation is the remove operation; and
if the consistent convexity is convex the operation is the add operation.

6. The computer-implemented method of claim 1, further comprising:
repositioning two edges; and
rebuilding the topology surrounding the two edges.

7. The computer-implemented method of claim 1, further comprising:
selecting the face;
determining a set of faces that includes the selected face, wherein the set of faces are comprised of at least one boundary loop;
removing the set of faces; and
rebuilding the topology of the 3D model to patch an absence of the set of faces.

8. The computer-implemented method of claim 1, further comprising:
selecting the face; and
one of applying an inward and an outward extrusion operation to the face.

9. A computer-aided design system comprising:
a processor operatively coupled to a data storage system, the data storage system storing a three-dimensional model; and
a data storage memory operatively coupled to the processor and comprising instructions to configure the processor to:

create a three-dimensional (3D) model represented by a sub-division surface and defining one of a solid and a surface model;
enable selection of a face of the 3D model;
based on the selected face and at least one surrounding entity, automatically determining entities associated with a six-sided polyhedral to which the face belongs, the entities including any of another face, an edge, and a vertex, and automatically determining a change type, the change type being a type of change to a topology of the 3D model to perform, the change type defining a way to add material to the 3D model or remove material from the 3D model by: (a) repositioning one or more of the entities associated with the six-sided polyhedral, and (b) rebuilding the topology surrounding the repositioned one or more entities to add or remove the material, wherein the change type is determined based on at least one other surrounding entity of the six-sided polyhedral; and
automatically perform an operation using the determined change type, wherein:
the operation is one of an add operation and a remove operation; and
using the determined change type, the operation applies a change in the topology of the 3D model that (i) increases a size of the 3D model if the operation is the add operation and (ii) decreases the size of the 3D model if the operation is the remove operation.

10. The computer-aided design system of claim 9, wherein the operation repositions one or more edges of the 3D model and rebuilds the topology surrounding the one or more edges.

11. The computer-aided design system of claim 9, wherein:
the selected face contains a vertex surrounded by three faces having radiating edges with a consistent convexity;
if the consistent convexity is concave the operation is the remove operation; and
if the consistent convexity is convex the operation is the add operation.

12. The computer-aided design system of claim 9, comprising instructions to further configure the processor to:
determine a set of faces that includes the selected face, wherein the set of faces are comprised of at least one boundary loop;
removing the set of faces; and
rebuilding the topology of the 3D model to patch an absence of the set of faces.

13. The computer-aided design system of claim 9, comprising instructions to further configure the processor to apply one of an inward and an outward extrusion operation to the selected face.

14. The computer-aided design system of claim 9, wherein:
the change type determines a first set of entities to remove and a second set of entities to create to change the topology.

15. A non-transitory computer-readable data storage medium comprising instructions causing a computer to:
create a three-dimensional (3D) model represented by a sub-division surface and defining one of a solid and a surface model;
enable selection of a face of the 3D model;
based on the selected face and at least one surrounding entity, automatically determining entities associated with a six-sided polyhedral to which the face belongs, the entities including any of another face, an edge, and a vertex, and automatically determining a change type, the change type being a type of change to a topology of the 3D model to perform, the change type defining a way to add material to the 3D model or remove material from the 3D model by: (a) repositioning one or more of the entities associated with the six-sided polyhedral, and (b) rebuilding the topology surrounding the repositioned one or more entities to add or remove the material, wherein the change type is determined based on at least one other surrounding entity of the six-sided polyhedral; and automatically perform an operation using the determined change type, wherein:

the operation is one of an add operation and a remove operation; and using the determined change type, the operation applies a change in the topology of the 3D model that (i) increases a size of the 3D model if the operation is the add operation and (ii) decreases the size of the 3D model if the operation is the remove operation.

16. The non-transitory computer-readable data storage medium of claim 15, further comprising instructions causing the computer to change the topology based on a determination of the change type, a first set of entities to remove, and a second set of entities to create.

17. The non-transitory computer-readable data storage medium of claim 15, wherein the operation repositions one or more edges of the 3D model and rebuilds the topology surrounding the one or more edges.

18. The non-transitory computer-readable data storage medium of claim 15, wherein:

the selected face contains a vertex surrounded by three faces having radiating edges with a consistent convexity;

if the consistent convexity is concave the operation is the remove operation; and if the consistent convexity is convex the operation is the add operation.

19. The non-transitory computer-readable data storage medium of claim 15, further comprising instructions causing the computer to:

determine a set of faces that includes the selected face, wherein the set of faces are comprised of at least one boundary loop;

removing the set of faces; and rebuilding the topology of the 3D model to patch an absence of the set of faces.

20. The non-transitory computer-readable data storage medium of claim 15, further comprising instructions causing the computer to apply one of an inward and an outward extrusion operation to the selected face.

* * * * *